July 22, 1969 E. C. TROY 3,456,906
COOLING AND CONDITIONING UNIT FOR GRANULAR MATERIAL
Filed May 5, 1966 12 Sheets-Sheet 3

INVENTOR:
ELBERT C. TROY
BY
*Mason, Kolehmainen, Rathburn & Wyss*
ATT'YS

July 22, 1969  E. C. TROY  3,456,906
COOLING AND CONDITIONING UNIT FOR GRANULAR MATERIAL
Filed May 5, 1966  12 Sheets-Sheet 4
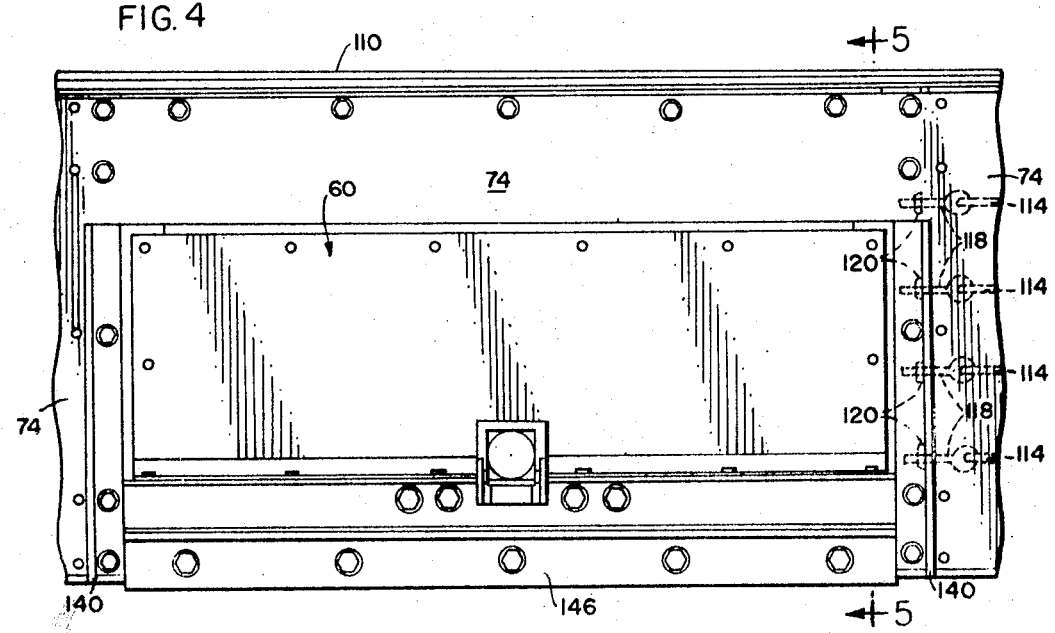
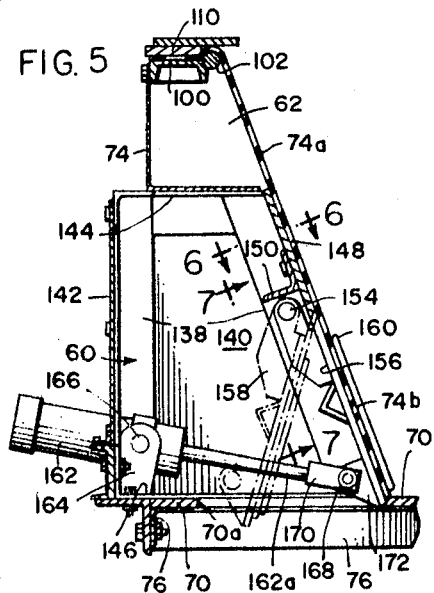
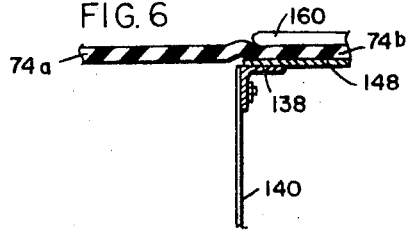
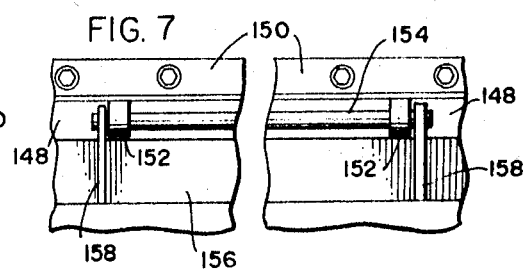
INVENTOR:
ELBERT C. TROY
BY
Mason, Kolehmainen, Rathburn & Wyss
ATT'YS July 22, 1969 E. C. TROY 3,456,906
COOLING AND CONDITIONING UNIT FOR GRANULAR MATERIAL
Filed May 5, 1966 12 Sheets-Sheet 5
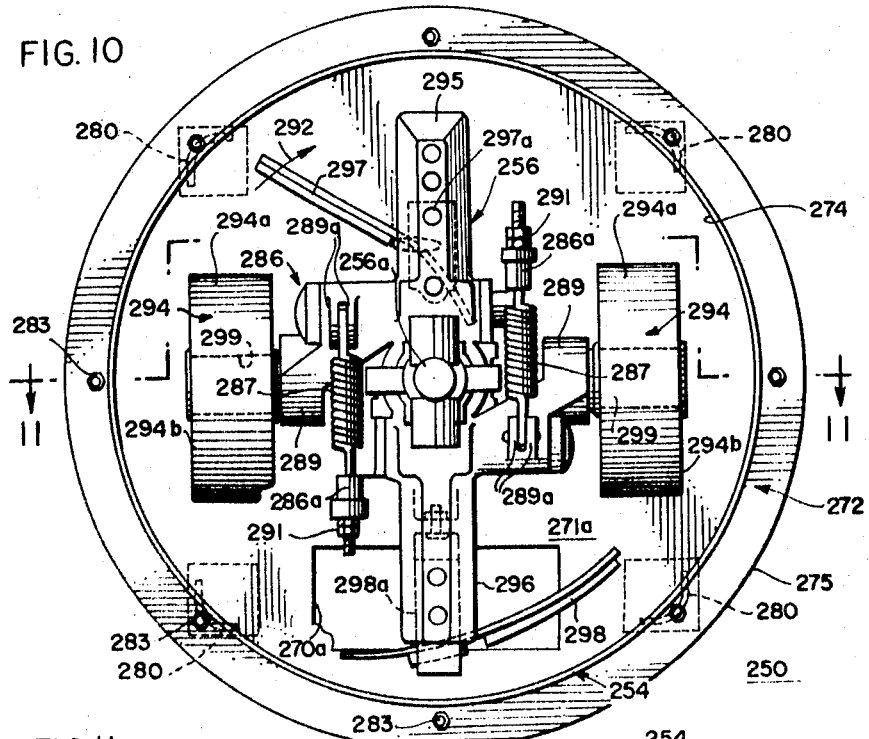
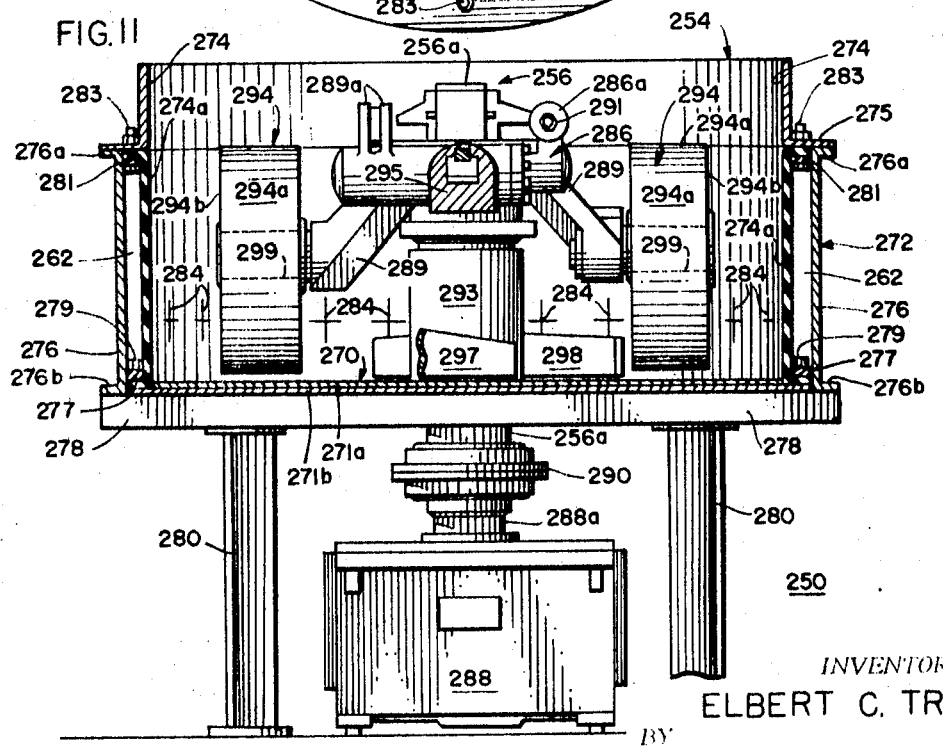
INVENTOR:
ELBERT C. TROY
BY
ATT'YS July 22, 1969 E. C. TROY 3,456,906
COOLING AND CONDITIONING UNIT FOR GRANULAR MATERIAL
Filed May 5, 1966 12 Sheets-Sheet 6

INVENTOR:
ELBERT C. TROY
BY
Mason, Kolehmainen, Rathburn & Wyss
ATT'YS

July 22, 1969  E. C. TROY  3,456,906
COOLING AND CONDITIONING UNIT FOR GRANULAR MATERIAL
Filed May 5, 1966  12 Sheets-Sheet 9

INVENTOR:
ELBERT C. TROY
BY
Mason, Kolehmainen, Rathburn & Wyss
ATT'YS

July 22, 1969    E. C. TROY    3,456,906
COOLING AND CONDITIONING UNIT FOR GRANULAR MATERIAL
Filed May 5, 1966    12 Sheets-Sheet 10

INVENTOR:
ELBERT C. TROY
BY
Mason, Kolehmainen, Rathburn & Wyss
ATT'YS

July 22, 1969        E. C. TROY        3,456,906

COOLING AND CONDITIONING UNIT FOR GRANULAR MATERIAL

Filed May 5, 1966        12 Sheets-Sheet 11

INVENTOR:
ELBERT C. TROY
BY
Mason, Kolehmainen, Rathburn & Wyss
ATT'YS

July 22, 1969  E. C. TROY  3,456,906

COOLING AND CONDITIONING UNIT FOR GRANULAR MATERIAL

Filed May 5, 1966  12 Sheets-Sheet 12

INVENTOR:
ELBERT C. TROY
BY
Mason, Kolehmainen, Rathburn&Wrye
ATT'YS

United States Patent Office 3,456,906
Patented July 22, 1969

3,456,906
COOLING AND CONDITIONING UNIT FOR GRANULAR MATERIAL
Elbert C. Troy, Highland Park, Ill., assignor to National Engineering Company, Chicago, Ill., a corporation of Delaware
Filed May 5, 1966, Ser. No. 547,824
Int. Cl. B02c 21/00, 13/288, 17/16
U.S. Cl. 241—47                                    24 Claims

ABSTRACT OF THE DISCLOSURE

Apparatus for conditioning particulate material comprising a mixing chamber having a bottom wall and a peripheral sidewall extended upwardly therefrom. A mixing head assembly is mounted in said chamber for rotation about an upstanding axis and includes a mixing member spaced outwardly of the axis, movable around the chamber on rotation of the head. The sidewall includes a lower portion sloping upwardly from the bottom wall and outwardly of the mixing head axis. A plenum chamber is provided outwardly adjacent the sloping portion of the sidewall and has an inner wall defined thereby and a plurality of opening defining means are formed in the sloped portion of the sidewall for directing gaseous fluid from the plenum chamber directly into the material in the mixing chamber for cooling the same.

---

The present invention relates generally to new and improved apparatus for conditioning particulate materials and, more particularly to apparatus generally termed as mixers and including those employing large heavy mulling wheels for breaking down and pulverizing agglomerated materials as they are being mixed or blended.

One of the problems associated with mixing equipment for conditioning particulate materials, such as sand and the like, is that of removing the materials from the sidewalls of the mixing chamber in which the material is being treated. In mixers employing large heavy mulling wheels for pulverizing and grinding lumps and agglomerates of wet sticky material, the problem of material buildup on the mixing chamber sidewalls causes excessive power to be required to move the mulling wheels around the chamber because the wheels must plow through an increased thickness of material around the outer portion of the mixing chamber. Another problem associated with previous mixers of the type described is that of eliminating dead areas in the chamber wherein the material tends to accumulate without being mixed. This difficulty necessitated that the mixing chambers be made circular only or, in the case of machines having multiple mixing heads, that the mixing chamber walls around each head be made circular and resulted in the requirement for a pinched in or narrow midsection at the junction of the sidewalls adjacent an area intermediately between the mixing heads and traversed by the plows of both heads. Because of these limitations in the shape of the mixing chambers, structure designs and costs are considerably higher than for a chamber of comparable size having a square or rectangular shape.

The present invention eliminates many of the problems mentioned above and has for a general object the provision of a new and improved apparatus for treating and conditioning particulate materials.

More specifically, it is an object of the present invention to provide a new and improved apparatus for mixing particulate materials having means for preventing the buildup and collection of materials on the mixing chamber walls.

Another object of the invention is the provision of a new and improved apparatus for mixing particulate materials having means for eliminating dead areas in the mixing chamber wherein the materials collect and remain.

Still another object of the present invention is the provision of a new and improved mixing apparatus for particulate materials wherein the walls of the mixing chamber and the rotating mixing head assembly combine to provide self-cleaning action to prevent the buildup of material on the chamber walls and to prevent dead spaces in the chamber wherein no mixing action takes place.

Yet another object of the present invention is the provision of a new and improved mixing apparatus for particulate materials wherein the mixing chamber walls are alive or movable in response to the pressure thereon from the materials being mixed.

A further object of the invention is the provision of a new and improved mixing apparatus for particulate materials employing large, heavy mulling wheels for pulverizing and grinding the materials and including means for reducing the power required for moving the wheels around the mixing chamber.

A still further object of the present invention is the provision of a new and improved apparatus for mixing particulate materials employing resilient movable mixer chamber wall means and permitting planar, rectangular and square mixing chamber configurations rather than requiring curved wall surfaces.

Yet another object of the invention is the provision of a new and improved apparatus for mixing particulate material employing multiple rotating mixing head assemblies, yet not requiring that the mixing chamber be reduced in width or narrowed in a region intermediately between the mixing heads and traversed by the plows of both mixing heads.

Another object of the invention is the provision of a new and improved apparatus for conditioning particulate material employing novel means for injecting cooling or heating gases into the material during mixing for cooling, heating and aerating the material.

A further object of the present invention is the provision of a new and improved apparatus for treating particulate materials employing flexible mixing chamber wall means and new and improved controllable discharge means associated with said wall means.

Still another object of the invention is the provision of a new and improved apparatus for conditioning particulate material employing flexible mixing chamber walls having a plurality of openings formed therein for the injection of gaseous fluid into the material being mixed in the chamber.

Yet another object of the present invention is the provision of a new and improved apparatus for treating particulate material employing flexible resilient wall means and novel means for supporting said wall means to permit deflection thereof by the pressure of material in the apparatus.

The foregoing and other objects and advantages are accomplished in one embodiment of the present invention comprising a new and improved apparatus for conditioning particulate material including a mixing chamber having a bottom wall and an upwardly extending sidewall. A mixing head assembly is mounted in the mixing chamber for rotation about an upstanding axis therein, and the head assembly includes mixing means ouwardly of the axis for moving and mixing the material around the chamber and against said sidewall. The sidewall includes a wall portion constructed of flexible, resilient material, such as synthetic or natural rubber and is supported so that it will be deflectable inwardly and outwardly toward and away from the axis of the chamber in response to the pressure of material moved thereagainst by rotation of the mixing head and mixing means thereof. The flexible wall portion becomes alive as the mixing head rotates and is more or less self-cleaning of the material. Even when the material is wet and sticky it does not collect on the lively, active walls but is moved by the wall action back toward the central portion of the mixing chamber. Because of the lively wall action, the mixing chamber can be constructed to be square or rectangular, rather than circular, thus simplifying construction and insuring that there are no dead spaces or corners where material collects, even though sharp or square corners are present. Another advantage of the flexible wall construction is that fluid openings can be easily provided at any desired location therein by cutting or puncturing the flexible wall material, and in installations wherein it is necessary to heat or cool the material in the chamber with gaseous fluids, injection of the fluid through the openings cut in the flexible wall is extremely effective, and the openings are not easily clogged with material.

In another embodiment of the present invention, a new and improved apparatus for conditioning particulate material is provided a mixing chamber with a bottom wall and a peripheral sidewall sloping upwardly and outwardly from the bottom wall. A mixing head assembly is mounted in the chamber for rotation about an upstanding axis therein and includes one or more mulling wheels outwardly of the axis movable around the chamber for grinding and pulverizing material against the bottom wall. The mulling wheel or wheels include outer sides disposed to face the outwardly sloping sidewall of the chamber, and as the wheels move around the bed of material in the bottom of the chamber some of the material is forced outwardly by the plowing action of the wheels. Because of the outwardly sloping sidewall construction, the material is pushed upwardly and outwardly on the sloping wall by the passing wheels and, after passage of the wheels, the material gravitates back toward the central portion of the mixing chamber. Accordingly, the power required for rotating the mixing head to move the mulling wheels through the material is reduced because of the outwardly sloping sidewalls which permits the height of the material in shearing engagement with the outer side faces of the wheels to be reduced considerably over that which would be encountered if the sidewalls were vertically upstanding.

In apparatus for treating particulate materials which employ multiple mixing head assemblies in a single mixing chamber, the construction of the chamber is greatly simplified and less expensive by utilizing the features of the invention comprising flexible wall means and outwardly sloping wall means. By providing these features in multiple head machines, it is possible to eliminate altogether the requirement of a pinched-in or narrow wall configuration adjacent the region intermediate the heads which is traversed by the plows of both heads.

For a better understanding of the present invention reference should be had to the following detailed description, when taken in conjunction with the drawings, in which:

FIG 4 is a fragmentary side elevational view taken substantially along line 4—4 of FIG. 3 illustrating the discharge apparatus of the invention in enlarged detail;

FIG. 5 is a fragmentary transverse sectional view taken substantially along the line 5—5 of FIG. 4;

FIG. 6 is a fragmentary sectional view taken substantially along line 6—6 of FIG. 5;

FIG. 7 is a fragmentary sectional view taken substantially along line 7—7 of FIG. 5;

FIG. 8 is an enlarged fragmentary view of a lower portion of the wall section of the apparatus illustrating one form of fluid outlet means used with the flexible wall section;

FIG. 9 is a fragmentary cross-sectional view taken substantially along line 9—9 of FIG. 8;

FIG. 10 is a top plan view of another embodiment of a new and improved apparatus for conditioning particulate material constructed in accordance with the present invention;

FIG. 11 is a cross-sectional view of the apparatus of FIG. 10 taken substantially along line 11—11 thereof;

Figure 1:
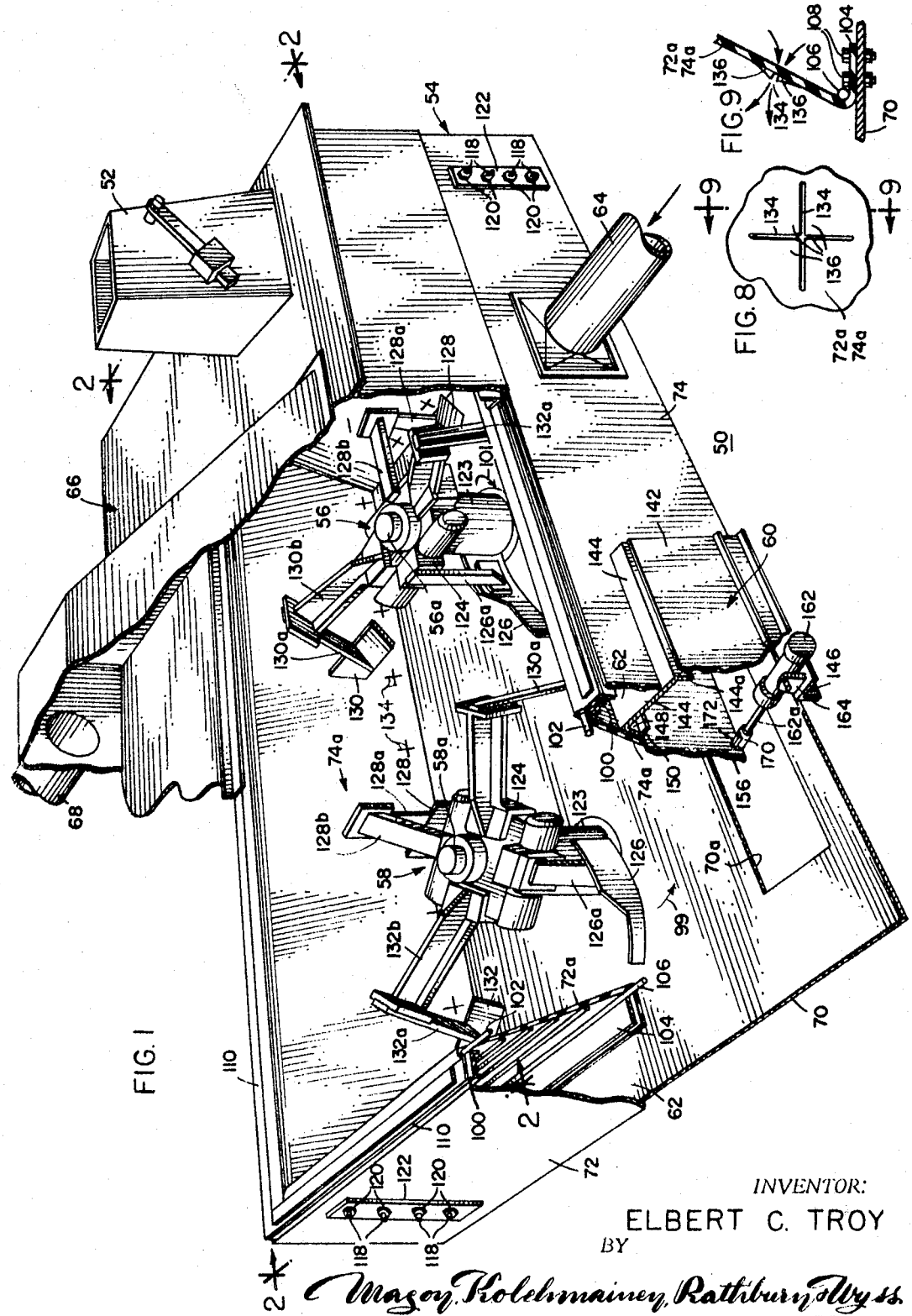
FIG. 1 is a perspective view of one embodiment of a new and improved apparatus for treating particulate material constructed in accordance with the features of the present invention and with portions broken away showing internal portions thereof.

Referring now, more particularly, to the drawings, in FIGS. 1 through 9 is illustrated one embodiment of a new and improved apparatus for conditioning material constructed in accordance with the present invention and referred to generally by the reference number 50. The apparatus 50 may be generally referred to as a mixer and is adapted to receive a continuous flow of particulate material, such as foundry sand and the like, through an inlet chute 52 at one end of the mixture. The material is introduced through the inlet chute 52 into a large mixing chamber 54 and is conditioned therein by mixing, cooling or heating and aeration. A final stage or conditioning process on the material processed in the mixer 50 may, if desired, be performed in a separate machine, preferably of the type shown and described in further embodiment of the invention herein or in a mulling machine, such as that described and illustrated in the U.S. Patents Nos. Re. 25,475 or 2,727,696.

A pair of spaced-apart mixing head assemblies 56 and 58 are mounted in the mixing chamber 54 to rotate about respective, upstanding, spaced-apart, axes therein and the material entering the mixing chamber is thoroughly and intimately mixed and agitated as it is moved around the chamber by the mixing heads. The mixing head assemblies are driven to rotate in opposite directions and are synchronized together so that the plow structures of one head assembly do not interfere with those of the other, even though the axes of rotation are spaced from one another at a selected distance so that a common area in the chamber intermediate the two head assemblies is traversed by the plow structures of both assemblies. Because of this common area, material is transferred back and forth in the mixing chamber between the head assemblies in a manner similar to that described in greater detail in the aforementioned U.S. Patent No. Re. 25,475. Generally, however, the continuous flow of material entering the mixing chamber 54 through the inlet chute 52 is treated first by the mixing head assembly 56 in a first stage of conditioning and then moves toward the other end of the chamber for conditioning in a second or final stage by the other head assembly 58 before it is ultimately discharged as finished material through a discharge opening in the bottom wall of the mixing chamber. Discharge of the material through the opening is controlled by a movable discharge door or gate mounted in a boxlike housing 60 adjacent the second mixing head 58.

As the material is being mixed in the chamber 54 by the head assemblies 56 and 58, it is heated or cooled and aerated by heated or cooled air supplied from a manifold or plenum chamber 62 extending around the outer portion of the mixing chamber. The cooling or heating air is directed into the manifold 62 by means of a fan (not shown) through an inlet duct 64 communicating with the interior of the manifold and is injected into the material in the chamber from around the periphery of the chamber through a plurality of openings or outlets spaced along the inner wall of the chamber. A removable exhaust hood or top cover structure 66 is provided to enclose the upper end of the mixing chamber and the exhaust fumes and air from the chamber are carried away through an exhaust duct 68 connected to the hood structure, as shown in FIG. 1. In installations where cooling, heating, or aeration is not important, the hood structure can be removed from the mixing chamber 54, as shown in FIG. 3.

Referring now more in detail to the mixing chamber 54, it is constructed with a large, rectangular bottom wall or floor 70, a pair of upstanding, rigid, outer end walls 72 (FIG. 3) and a pair of upstanding rigid longitudinal outer sidewalls 74, all preferably being constructed of steel plate or the like. The end walls 72 and sidewalls 74 are joined together at the corners of the mixing chamber by suitable means, such as by welding, and are likewise joined to the outer peripheral edges of the bottom wall 70 with a peripheral stiffening angle 76 being provided on the underside of the bottom wall to strengthen the connection with the upstanding ends and sidewalls. The bottom wall 70 is formed with a rectangular discharge opening 70a (FIGS. 1 and 5) located along one side of the chamber adjacent the mixing head 58, and the opening is enclosed by the boxlike discharge housing 60.

Figure 3:
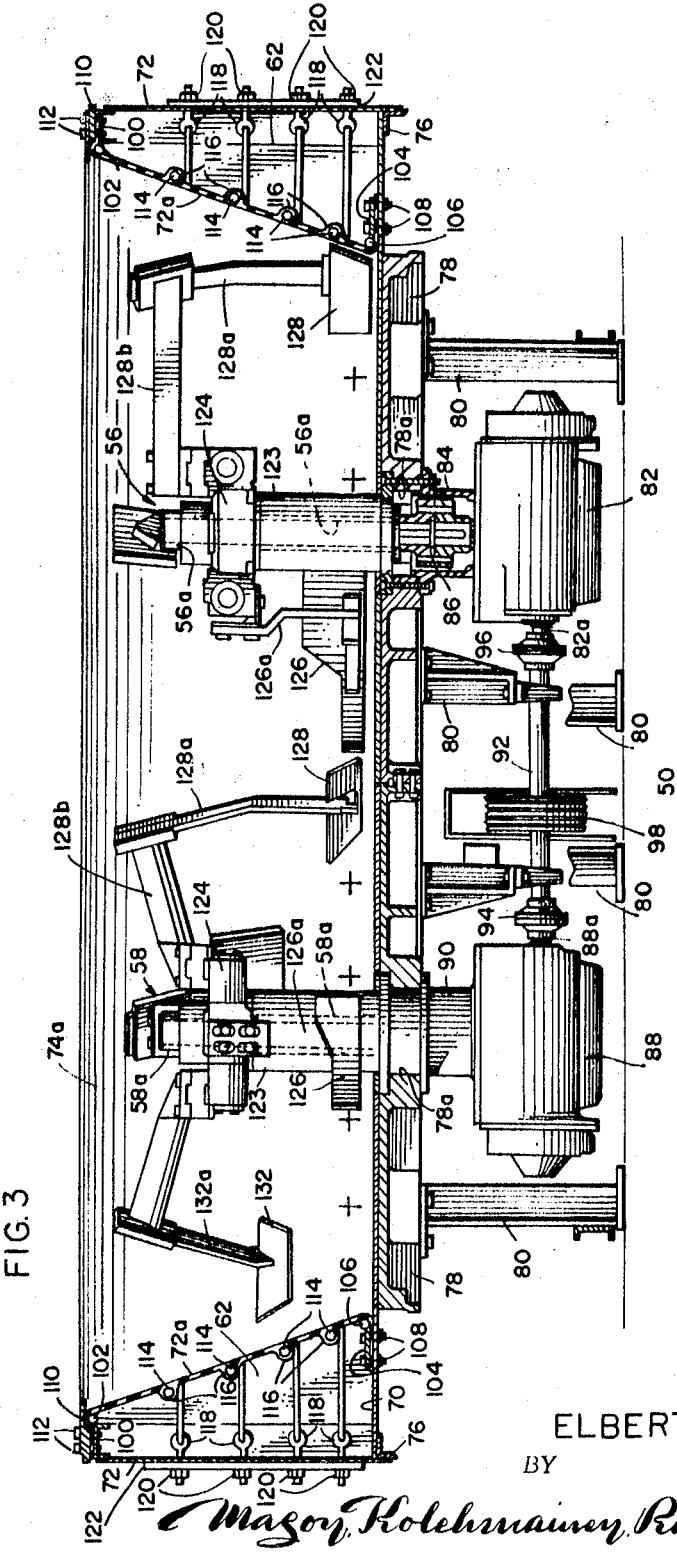
FIG. 3 is an elevational cross-sectional view taken substantially along the line 3—3 of FIG. 2.

The bottom wall is supported on a pair of large, heavy, bed structures 78 which in turn are supported from a floor or other structure by a plurality of depending legs 80 (FIG. 3). Preferably, the bed structures 78 are formed of cast steel or the like and each includes a centrally located aperture 78a to accommodate, respectively, upwardly projecting drive axles 56a and 58a which rotate and support the respective mixing head assemblies 56 and 58.

The mixing head assembly 56 is driven by a gear reducer 82 mounted on the underside of one of the bed structures 78 (right-hand in FIG. 3) and the speed reducer is supported by a flanged sleeve or shaft housing 84 projecting upwardly from the main body of the reducer into the bed structure opening 78a. The output shaft of the gear reducer 82 extends upwardly in the shaft housing 84 and is directly coupled to the upstanding drive shaft or axle 56a of the mixing head assembly 56 by means of a coupling assembly 86. The other mixing head assembly 58 is driven by a similar, separate gear reducer 88 mounted underneath the left-hand bed structure 78 (FIG. 3), and a flanged shaft housing 90, similar to the housing 84, is provided to support the main body gear reducer housing from the bed structure. Driving connection between the output shaft of the gear reducer 88 and the upstanding drive axle 58a of the mixing head assembly 58 is not shown in the drawings, but preferably is identical to the driving connection between the reducer 82 and mixing head assembly 56 previously described.

The gear reducers 82 and 88 include respective input shafts 82a and 88a which are in coaxial alignment with each other and coupled to a common drive axle 92 by a pair of coupling assemblies 94 and 96. In this manner driving synchronization between the two mixing head assemblies 56 and 58 is insured because the common drive shaft 92 is driven by a single power source or prime mover (i.e., an electric motor, not shown) through a belt drive assembly 98. As previously stated, the mixing head assemblies 56 and 58 are driven to rotate in opposite directions, as indicated by arrows 99 and 101 (FIG. 2), and, accordingly, the gear reducers 82 and 88 are constructed for right-hand and left-hand drive, respectively, to achieve the desired opposite directions of mixing head rotation.

Figure 13:
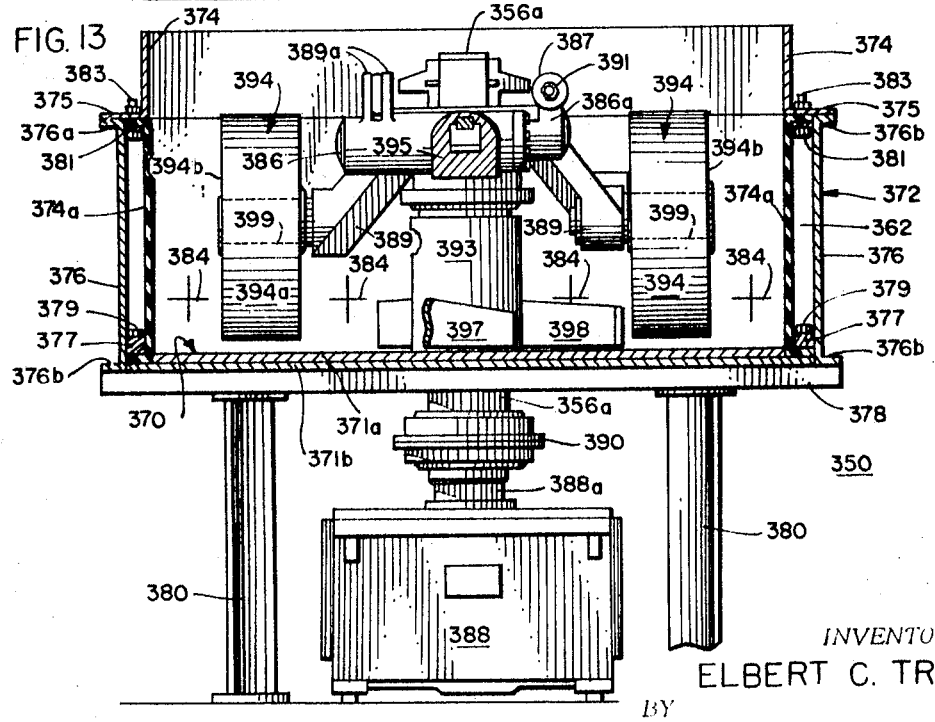
FIG. 13 is a cross-sectional view of the apparatus of FIG. 12 taken substantially along line 13—13 thereof.

Along the upper edges of the end walls 72 and sidewalls 74 there is provided a continuous, stiffener or upper rim member extending around the periphery of the mixing chamber and taking the form of an inverted channel 100 and a rod 102 welded to the inner flange thereof. The stiffening rim structure provides support for the upper edges of inwardly and downwardly sloping inner end and sidewall sections 72a and 74a which are constructed from sheets of flexible, resilient material, such as rubber or synthetic plastic material. The lower edges of the flexible wall sections 72a and 74a are turned under and outwardly and are secured to the bottom wall 70 of the mixing chamber by a lower clamping structure formed by lengths of flat metal bars or strips 104 having rods 106 welded or otherwise secured along the inner edges thereof. As best shown in FIGS. 1 and 13, the lower, turned under, edge portions of the flexible inner walls 72a and 74a are sandwiched between the bottom wall 70, and the lower clamping members 104 and 106 which are parallel to and spaced inwardly from respective outer side and end walls 74 and 72. The clamping structure is held in place on the bottom wall 70 by removable bolts 108, and the rod 106 along the inner edges of the clamping strips 104 provides for a smooth bending of the inner wall sections 72a and 74a so that excessive stress or tearing does not occur in this region. Likewise, the rods 102 on the upper rim channels 100 provide for smooth bending along the upper edge portions of the flexible sidewall sections 72a and 74a.

The upper edge portion of the flexible inner wall sections 72a and 72b are clamped in place against the web of the inverted channel sections 100 by means of upper rim plates 110 bolted to the web of the channel sections with a plurality of bolts 112 (FIG. 3). The flexible inner wall sections 72a and 74a can be integrally cut from a larger single sheet of material or can be formed of individual pieces of material joined at intersecting corners of the mixing chamber 54 by vulcanizing or clamping means (not shown). During installation of the flexible inner wall sections they are first secured to the bottom wall 70 of the chamber by the lower clamping strips 104 and bolts 108. The wall sections are then stretched upwardly from the rods 106 and over the upper rod 102 on the channels 100. The outwardly extending upper edge portions of the inner wall sections 72a and 74a are then secured in place by the rim plates 110 and bolts 112 so that the wall sections are stretched or held under tension between the rigid upper and lower supports in a manner similar to that of a drum head. Accordingly, the inner wall sections 72a and 74a are resiliently deflectable inwardly and outwardly intermediate their rigidly supported upper and lower edge portions.

In a mixer constructed in accordance with the present invention, the inner wall sections 72a and 74a were fabricated from sheets of synthetic rubber material having a canvas backing on one side and having a thickness of approximately ⅜ inch. The material used was obtained from the Linatex Corporation of America, sold under the trade name "Linatex" but other types and grades of flexible, resilient sheet materials could be used. This material is tough, strong and resilient and is resistant to the acids and other agents commonly associated with foundry sand and the like.

While the resilient, flexible inner walls 72a and 74a are rigidly supported along their upper and lower edge portions as previous described, it is also desirable to support these walls intermediate the rigidly supported edge portions to reduce some of the strain on the wall material encountered during mixing operations. To this end, a plurality of horizontally extending, flexible support cables 114 are used to back up the flexible wall sections 72a and 74a, and the cables are secured to the back faces thereof by means of spaced-apart loop members 116 also formed of resilient material and vulcanized, cemented, or otherwise fastened to the flexible wall material. Each loop member 116 includes an opening to accommodate a cable extending therethrough and, preferably, several loop members are spaced along the length of each cable to tie the cable and flexible wall sections together. The cables 114 are arranged to extend between the opposite, rigid outer end and sidewalls 72 and 74 and are maintained under tension to provide the desired support for the flexible inner walls 72a and 72b. The cables are connected at their ends to eyebolts 118 having threaded stems which project outwardly through openings formed in the rigid, outer sidewalls and nuts 120 are threaded onto the projecting stems of the eyebolts 118. Suitable bearing plates 122 are provided to distribute the load of the cables to the outer sidewalls 72 and 74 and, by tightening or loosening the nuts 120, the desired tension on the cables 114 can be obtained and, hence, the amount of flexibility of the wall structures 72a and 74a can be adjusted. As material in the mixing chamber 54 is moved outwardly by the mixing heads 56 and 58 against the flexible wall sections 72a and 74a, the cables 114 help absorb the shock load and aid in strengthening the wall sections in rebounding inwardly to return the material toward the center of the mixing chamber.

The resilient flexible walls 72a and 74a can be described as being alive during rotation of the mixing heads 56 and 58 as distinguished from previous types of rigid wall structures used. Because of the live action of the flexible walls, material buildup thereon is reduced to a minimum, even though extremely sticky or sloppy material is being treated. Another advantage of the live wall structure is the fact that instead of being round or oval, the mixing chamber can be rectangular or square in plan configuration without the creation of dead spaces in the corners where material tends to collect. In this connection, it is to be noted that a mixer of the same general type as the mixer 50 disclosed in the copending U.S. Patent application, Ser. No. 502,923, filed Oct. 23, 1965 includes chamfered corner sections to help eliminate dead areas. By the use of flexible walls, the present invention has eliminated the need for such chamfered corner sections, thus permitting a simplification in the fabrication of the mixing chamber. It should also be noted that multiple head mulling machines, such as the one described in U.S. Patent No. Re. 25,475, utilizes a figure eight-shaped mixing chamber having a pinched-in or reduced width region intermediate its two mulling head assemblies. The flexible wall construction of the present invention eliminates the need for such a pinched-in or narrow section between the mixing heads of multiple head machines because of the live action of the flexible walls.

Preferably, the mixing head assemblies 56 and 58 are similar or identical to one another and may be of a construction similar to that shown in the aforementioned U.S. patent application Ser. No. 502,923, filed Oct. 23, 1965, now Patent No. 3,406,590. The mixing head drive axles 56a and 58a are journaled for rotation in a pair of upstanding sleeves 123 having flanged lower ends seated in upper shouldered recesses formed in the openings 78a in the bed structures 78, as best shown in FIG. 3. Each head assembly includes a central turret head 124 mounted to rotate with the drive axle of the head for supporting a plurality of plow structures comprising a pair of lower plows or scrapers 126 and 128 and a pair of upper plows or skimmer plates 130 and 132. The lower plows 126 extend outwardly of the sleeves 123 to move the material toward the periphery of the mixing chamber as the mixing heads rotate, and these plows are supported by downwardly extending support arms 126a having their upper ends bolted to the turret head 124. The lower plows 128 are spaced outwardly of the axes of the mixing head assemblies and are positioned to direct the material around the periphery of the mixing chamber inwardly toward the sleeves 123 as the mixing heads rotate. The plows 128 are supported on downwardly extending brackets 128a which are secured to the outer ends of outwardly extending plow support arms 128b mounted on the turret heads 124. The upper plows or skimmer plates 130 and 132 are carried by support brackets 130a and 132a which, in turn, are supported from the ends of respective cross arms 130b and 132b. The skimmer plates are spaced above the lower plows and are formed with sloped outer edges which move in close proximity to the sloping flexible inner wall sections 72a and 74a.

As the mixing head assemblies 56 and 58 rotate, the lower plows 126 and 128 continuously mix and agitate the material on the mixer floor 70. The plows 126 tend to move the material outwardly toward the periphery of the mixing chamber while the plows 128 move the material inwardly toward the sleeve 123 of the mixing head assemblies. The mixing heads are driven at relatively speeds (50 to 70 r.p.m.) so that the mixing action is rapid and thorough. The axes of the respective head assemblies 56 and 58 are spaced apart by a selected distance so that the outer plows 128 and skimmer plates 130 and 132 of both head assemblies traverse a common region or center area in the mixing chamber, designated by the reference A in FIG. 2. Material moved into the region A by the plows and skimmer plates of one head assembly is then picked up by the plows and skimmer plates of the other head assembly and vice versa. Accordingly, material is continually moved back and forth in the chamber between the spaced mixing head assemblies in a manner similar to that described in U.S. Patent No. Re. 25,475.

The upper skimmer plates 130 and 132 mix and agitate the upper levels of material in the mixing chamber and move the material centrifugally outwardly against the sloping flexible inner wall surfaces 72a and 74a. As the material strikes the flexible wall surfaces, the walls are deflected outwardly and the cables 114 are put under increased tension. The material then rebounds off the wall surfaces as they deflect inwardly because of the elasticity thereof and is thrown inwardly toward the central portion of the respective mixing heads. The flexible walls 72a and 74a literally become alive dquring rotation of the mixing heads and contribute greatly to the efficiency of the mixing action. In addition, because of the flexible wall action, square or rectangular mixing chamber configurations are possible without having dead corners or requiring pinched-in center sections adjacent the region intermediate the spaced mixing head assemblies. The flexible walls are self-cleaning because of the lively action, and material buildup on the walls is not a problem.

Figure 2:
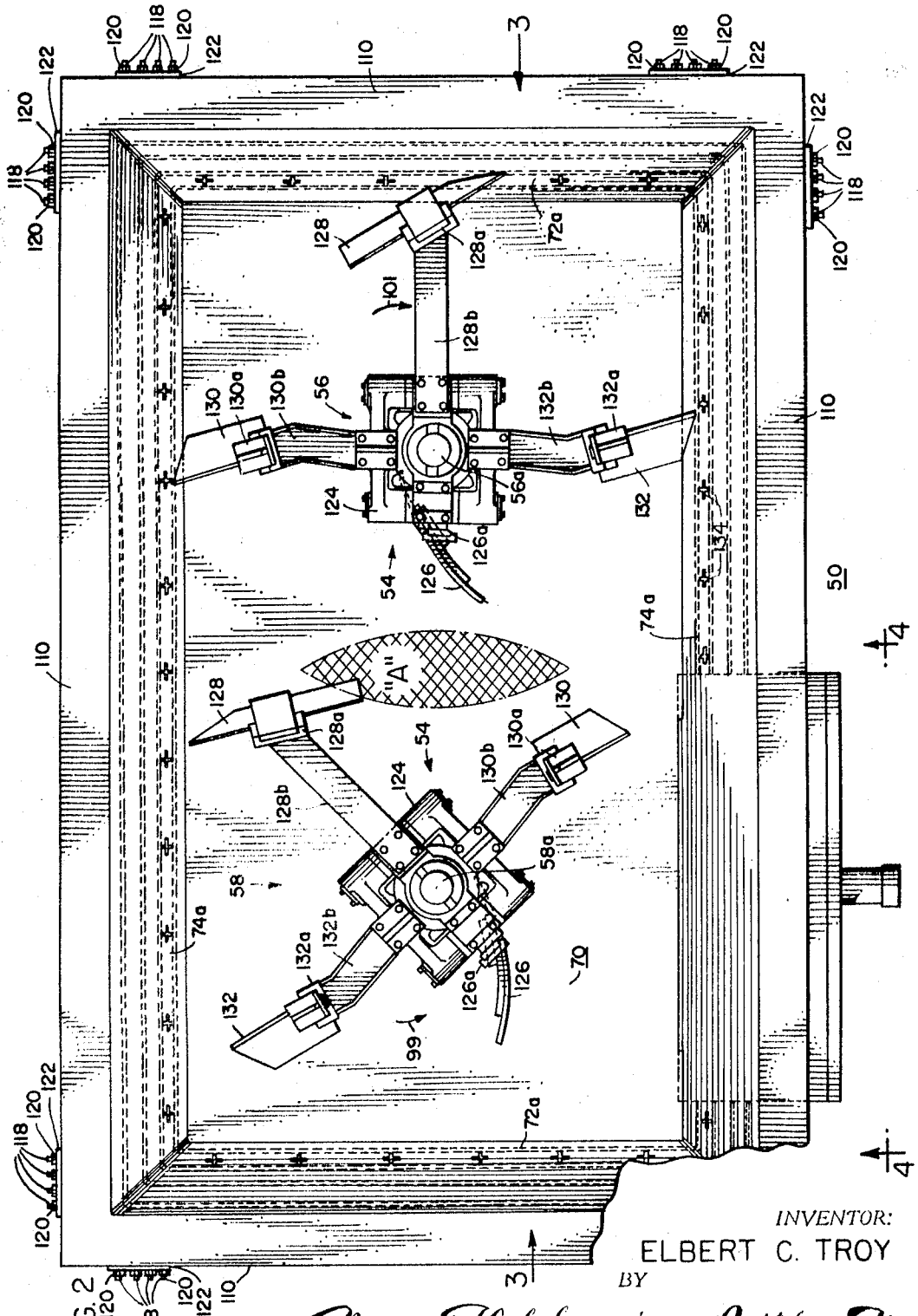
FIG. 2 is a top plan view of the apparatus of FIG. 1 taken along a sectional plane indicated by the arrows 2—2 of FIG. 1.

Another advantage of the flexible wall construction of the present invention is the simplicity of introducing heating or cooling air into the material in the chamber. The inner flexible wall sections 72a and 74a form the inner wall of the plenum chamber 62 which is continuous around the periphery of the mixing chamber except for the portion occupied by the boxlike outlet housing structure 60. A plurality of air openings are provided at spaced locations along the lower portions of the flexible inner walls 72a and 74a and these openings preferably take the form of a cross, as illustrated in detail in FIGS. 5, 8, and 9. The openings are formed by cutting two intersecting slits 134 in the wall material at various locations therealong, as shown in FIGS. 1, 2, and 3. Each cross or pair of slits 134 forms a nozzle for the passage of air directly into the material, as shown in FIG. 9 and, because the walls are continually moving and flexing, nozzle clogging problems encountered with other types of nozzle structures are eliminated. Because the openings are formed in the flexible wall sections by merely cutting the slits 134, they can be located anywhere and there are no other parts or nozzle structures required. The slits provide for high velocity discharge from the plenum chamber 62 directly into the material in the chamber, and thus excellent aeration and heating or cooling of the material is obtainable. By use of the intersecting slits rather than a single cut or hole punctured in the wall, better clearing action of the material around the openings is obtained because four small flaps or corners are formed adjacent the intersection of the crossing slits 134, and these flaps are deflectable outwardly by the air pressure in the plenum chamber (FIG. 9) and are movable back and forth, depending on the movement of material in the chamber. Because of the movement of the corner flaps 136, no problems of the slits 134 becoming plugged have been encountered.

Another advatage of the flexible wall construction of the present invention is in the unique construction of a discharge gate or door for the mixing chamber which employs a portion 74b of one of the flexible inner sidewalls 74a as a movable discharge gate. Referring to FIGS. 4, 5, 6, and 7 more specifically boxlike discharge housing 60 is formed with a pair of side frames 138 (FIG. 5) formed of angle iron and located at opposite ends on either side of the discharge opening 70a in the mixer floor 70. The frames 138 are somewhat trapezoidal in elevational view (FIG. 5), and a pair of sidewalls 140 are secured thereto making a portion of the plenum chamber 62 discontinuous between the discharge housing sidewalls. The housing 60 also includes a removable outer wall panel 142, a top panel 144, a bottom shelf or angle 146, and a fixed sloping inner wall 148 extending downwardly from the top panel but having a lower edge spaced upwardly from the mixer floor 70. The sloping inner wall 148 provides backing support for the flexible inner sidewall 72a adjacent thereto, and the lower fastening or clamping strips 104 and 106 are discontinuous between the sidewalls 140 of the housing 60, permitting the portion of the flexible inner wall 74a below the wall 148 to move outwardly into a position above the discharge opening 70a, as best shown in FIGS. 1 and 5.

A stiffening angle 150 is affixed to the sloping panel 148 and is spaced upwardly from the lower edge thereof in order to accommodate a pair of brackets 152 which are welded to the panel to support a door axle or hinge pin 154. The pin 154 supports a rigid, pivotally movable backing plate 156 secured thereto by a pair of support brackets 158 having openings therein to receive the pin. The backing plate 156 is pivotally movable about the pin 154 between a closed position (solid lines, FIG. 5) wherein the lower edge of the door abuts the inner edge of the discharge opening 70a and an open position (as indicated by dotted lines in FIG. 5). The portion of flexible inner sidewall 74a (designated as 74b, FIG. 5, and secured to the door 156) forms a flexible discharge gate for the mixer and the portion 74b is severed from the remaining portion of the sidewall 74a along the edges and bottom of the backing door 156 to permit flexure of the gate structure between open and closed positions for discharging material through the opening 70a. A protective pad 160 may be provided on the inside surface of the movable wall door portion 74b to clamp it tightly against the backing door 156, and suitable bolts are provided to hold the pad 160 in place.

From the foregoing it will be seen that the wall section 74b is a portion of the larger inner sidewall 74a of the mixing chamber, and the lower edge is movable outwardly over the discharge opening 70a to permit the discharge of material from the mixing chamber 54 at a controlled rate, depending upon the amount of pivotal movement of the backing door 156 from the closed position. It should be noted that while the floor discharge opening 70a is spaced outwardly of the lower edge of inner sidewall 74a, when the backing door 156 is moved toward an open position, in effect, the sidewall itself is deflected outwardly to uncover the opening and discharge material which is forced outwardly over the discharge opening by centrifugal action of the plow 126 and skimmer plates 130 and 132 of the mixing head assembly 58.

In order to control the discharge rate through the opening 70a, a fluid cylinder 162 is pivotally mounted in the housing 60 by a pair of brackets 164 and pivot pin and yoke structure 166. The cylinder 162 includes a movable piston and rod 162a which projects inwardly toward the backing door 156 and is pivotally connected thereto by a pivot pin 168, clevis 170, and a bracket 172 mounted adjacent the lower edge of the backing door 156. By directing pressurized fluid to alternate ends of the cylinder 162, the movement of the discharge door is controlled and an automatic system for effecting door movement may be employed, such as that shown in copending U.S. patent application Ser. No. 547,610, filed May 4, 1969, now Patent No. 3,395,834.

From the foregoing description, it is clear that the mixer 50, constructed in accordance with the present invention, provides many advantages in construction and operation over mixers previously used. The flexible sloping wall construction is extremely useful in aiding in the mixing of the material and provides a self-cleaning wall structure. Simplification of design and construction, elimination of dead corners and the requirement for pinched-in chamber sections intermediate the mixing heads are eliminated by the flexible wall construction. In addition, aeration of the material in the chamber is much simpler because of the ease in locating and forming the discharge openings for high velocity airflow.

Referring now to FIGS. 10 and 11 of the drawings, therein is illustrated another embodiment of a new and improved apparatus for conditioning particulate material constructed in accordance with the present invention and referred to generally by the numeral 250. The mixer 250 is especially adapted to grind, pulverize and mix wet, sloppy, agglomerated material, such as foundry sand and the like, to which an adhesive bonding material has been added, but the mixer is also useful in pulverizing other dry materials containing lumps and agglomerates.

The mixer includes a cylindrical mixing chamber 254 having a circular bottom wall 270 with a rectangular discharge opening 270a therein and a cylindrical upstanding sidewall structure 272 having a rigid upper portion or band 274 and a flexible lower portion 274a constructed at resilient flexible sheet material such as synthetic or natural rubber. Preferably, the flexible wall portion 274a is formed of rubber sheet material ¼ to ½ inch in thickness and having a canvas or cloth backing material applied to the outer face. Such material is commercially available from several sources, including the Linatex Corporation of America, which sells a suitable material under the trade name "Linatex."

As illustrated in FIG. 11, the mixer floor 270 includes a removable and replaceable upper wear plate 271a and a supporting underplate 271b slightly larger in diameter. The mixer floor is supported on a large bed structure 278 which, in turn, is supported from the floor or other structure by a plurality of support legs 280. The cylindrical, rigid, upper sidewall section 274 includes an outwardly extending lower flange 275 which supports the section as it rests upon the upper flange 276a of a rigid, cylindrical outer sidewall or jacket 276 having a lower flange 276b which rests upon the bed structure 278. The lower edge portion of the flexible wall section 274a is turned outwardly to form a lower flanged edge which is secured in place against the underplate 271b by means of a circular clamping ring 277 bolted to the underplate and bed structure by a plurality of spaced-apart bolts 279. The upper edge portion of the flexible wall section 274a is also turned outwardly, forming an upper flanged edge which is secured in place against the underside of the flange 275 by a circular upper clamping ring 281 and a plurality of upwardly extending spaced-apart bolts 283.

The flexible lower sidewall section 274a and the outer jacket 276 form the inner and outer walls, respectively, of an annular plenum chamber 262 for supplying airflow for heating or cooling and aerating the material in the mixing chamber 254. To this end, a plurality of openings, each formed by a pair of intersecting cuts or slits 284 are provided in the flexible inner wall material 274a to introduce high velocity airflow into the material being treated in the mixing chamber. The openings 284 can be placed at desired spaced intervals around the chamber wall and because the material of the wall is flexible, resilient rubber or the like it is relatively simple to cut the material to form the openings. Moreover, because the wall section 274a is flexible no problems are encountered because of plugging up of the slits 284 with the material in the chamber, and because the walls are continually being deflected inwardly and outwardly during a mixing operation, a self-cleaning action is produced which prevents buildup of material on the walls even though the material may be wet, sticky, and sloppy.

In order to grind, pulverize, and mix the material in the mixer 250, a mixing head assembly 256 is mounted in the mixing chamber 254 for rotation about a centrally located upstanding axis therein. The mixing head assembly includes a turret head 286 supported on the upper end of a drive axle 256a which extends downwardly through the bottom wall 270 of the chamber for driving connection with the output shaft 288a of a gear reducer 288 located underneath the mixing chamber. The shaft 288a is connected to the mixing head drive axle 256a by means of a coupling 290, and the reducer 288 is driven by a suitable prime mover, such as an electric motor (not shown) to rotate the mixing head assembly 256 around the chamber in the direction indicated by the arrow 292 of FIG. 10. The mixing head drive axle 256a is supported and journaled for rotation in an upstanding sleeve 293 which extends upwardly from the mixer floor 270 and terminates below the rotating turret head 256.

The mixing head assembly 256 includes a pair of large, heavy mulling wheels 294 disposed on opposite sides of the turret head 286 and the turret head includes a pair of oppositely extending plow support arms 295 and 296 for supporting a pair of inner and outer plows 297 and 298, respectively. The inner plow 297 is supported from the arm 295 by a bracket structure 297a and extends outwardly toward the sidewall structure 272 of the mixing chamber to move the material outwardly from the central portion of the chamber into the path of the mulling wheels 294 as the mixing head 256 rotates. The outer plow 298 is supported from the arm 296 by a bracket structure 298a and extends inwardly toward the central portion of the chamber to move the material around the periphery inwardly into the path of the mulling wheels 294 as the mixing head rotates. The lower edges of the plows 297 and 298 move in close proximity to the upper surface of the wear plate 271a and continually mix the bed of material in the chamber by movement inwardly and outwardly into the circular path traversed by the mulling wheels 294.

The mulling wheels 294 are of heavy construction and relatively large in diameter to provide the necessary force for grinding and pulverizing the material in the mixing chamber. The wheels include large, peripheral, outer mulling surfaces 294a adapted to force the material against the wear plate 271a and break up the lumps and agglomerates thereon. Each wheel is journaled for free rotation on an outwardly extending axle 299 with the outer side faces 294b of the wheels disposed to face the mixer sidewall structure 272. The axles 299 are movable up and down and are mounted on axle support members 289 which, in turn, are pivotally mounted on the turret head casting 286. As the mixing head 256 rotates the mulling wheels 294 are rotated on their axles 299 by frictional contact with the material and the mulling surfaces 294a pulverize and grind the material against the wear plate 271a as the wheels ride on the bed of material in a sort of floating action during their travel around the chamber 254. The plows 297 and 298 are continuously moving material into the path traversed by the mulling wheels so that pulverization and break down of the lumps and agglomerates are insured.

In order to increase the mulling pressure between the wheel surfaces 294a and the material in the chamber, each mulling wheel support arm 289 includes an upstanding bracket structure 289a, connected to one end of a spring biasing assembly 287. The opposite ends of the spring biasing assemblies 287 are adjustably connected to upstanding fixed bracket structures 286a on the turret head casting 286, and adjusting nuts 291 are provided for controlling the tension on the spring assemblies 287 to bias the wheels 294 downwardly with a selected biasing force. As the wheels tend to ride upwardly over the material on the mixing chamber floor, the bracket structures 289a on the wheel support members 289 pivot away from the fixed bracket structures 286a on the turret head and this tends to elongate the spring bias assemblies 287 and increase the downward biasing force exerted on the wheels. Conversely, when the material becomes fully pulverized, the mulling wheels 294 less frequently encounter large lumps of material and tend to settle downwardly.

One of the main problems encountered with mixers of the prior art employing mulling wheels is that the material, when wet and sticky, tends to collect on the mixer sidewall because of the squeezing or pasting action caused by passage of the mulling wheel close by. Specifically, material between the outer side faces of the wheels and the mixer sidewall is forced outwardly by the traveling mulling wheel and builds to a greater height on the sidewall, tending to remain there after the wheel passes by. This problem is completely eliminated in the mixer 250 by the use of the flexible sidewall section 274a. As the mixing head 256 rotates and the mulling wheels 294 move through the bed of material in the chamber, some of the material is squeezed outwardly against the sidewall section 274a. Because of the flexibility of the wall section, it is deflected outwardly by the material and, after passage of the mulling wheel, tends to rebound or spring inwardly and return the material toward the central portion of the mixing chamber. The flexible wall section 274a literally becomes alive during a mixing operation and, because of this continual deflection and rebound action, the walls are virtually self-cleaning and material buildup thereon is eliminated. Accordingly, the mixer 250 is extremely useful in conditioning wet, sticky and sloppy materials which are difficult to pulverize and grind. As previously pointed out, the flexible wall section and slit openings 284 therein provide a convenient means to aerating and heating or cooling the material as it is conditioned in the mixer.

Figure 12:
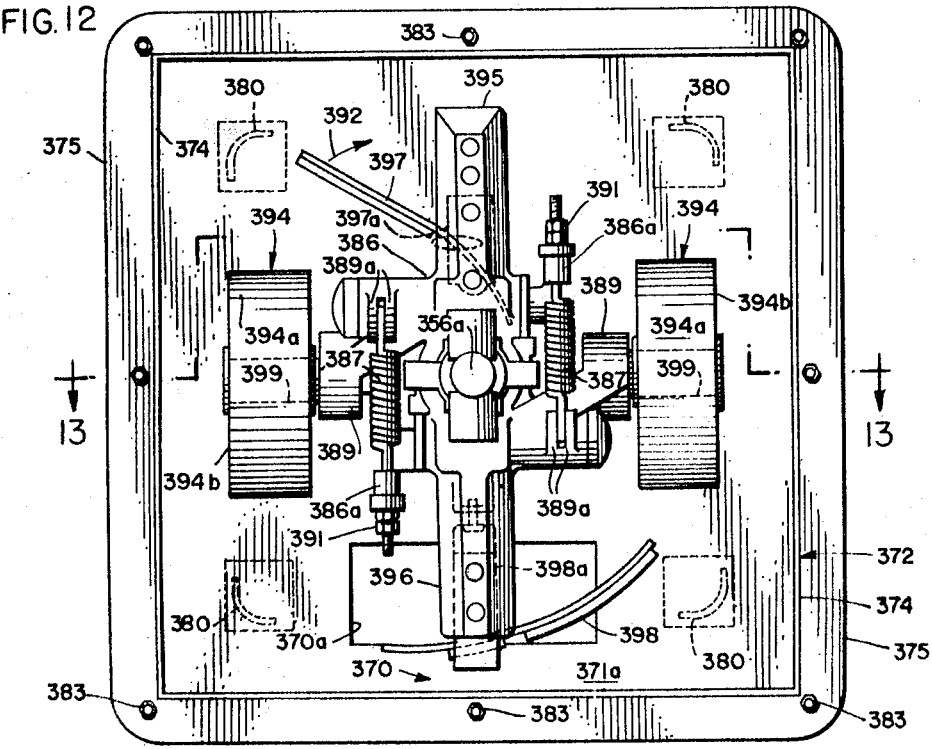
FIG. 12 is a top plan view of still another embodiment of a new and improved apparatus for conditioning particulate material constructed in accordance with the present invention.

Referring now to FIGS. 12 and 13 of the drawings, therein is illustrated another embodiment of a new and improved apparatus for conditioning particulate material constructed in accordance with the present invention and referred to generally by the reference numeral 350.

The mixer 350 is similar to the mixer 250 previously described and similar reference numerals with the prefix 3 will be used to identify components similar to those of the previous mixer using the prefix 2. Instead of the circular mixing chamber configuration, as in the previously described mixer 250, the mixer 350 includes a mixing chamber 354 which is square or rectangular in plan view, as shown in FIG. 13. It has been found that because of the live action of the flexible sidewall section 374a, it is not necessary to make the sidewalls curved and that sharp intersecting corners can be present in the mixing chamber without creating dead areas where the mixing action is slow or nonexistent. The mulling wheels 394 traverse a circular path around the axis of the chamber as the mixing head 356 is rotated and their outer side faces 394b become parallel with each planar chamber sidewall, once during every revolution of the mixing head. When this occurs, the flexible sidewall 374a is deflected a maximum distance outward by the outwardly moving material, and as the mulling wheels pass the region of closest proximity to each planar sidewall section, the flexible wall returns the material toward the central portion of the mixing chamber. Flexure of the sidewall sections adjacent their central portions also causes the corner wall portions to flex and vibrate providing live corners wherein the material is mixed and does not become stagnant or tend to accumulate. For this reason it is possible to use a mixing chamber 354 of square or rectangular plan configuration with good results and, accordingly, it is not necessary to provide any curved or rounded surfaces which would require the use of expensive rolling machinery to fabricate. The mixer 350 is thus lower in cost and simpler in construction because of the elimination of the need for curved wall surfaces.

Figure 14:
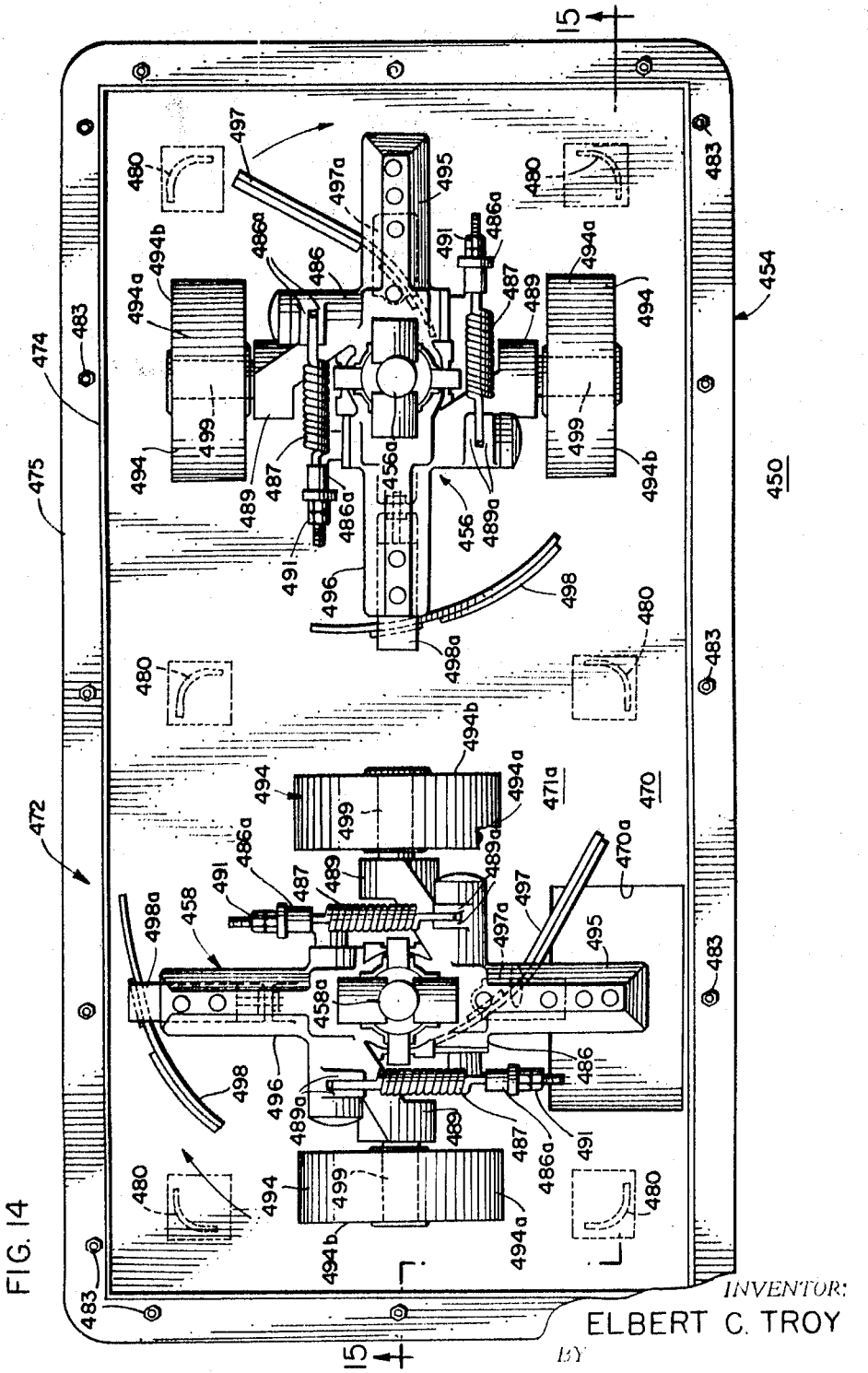
FIG. 14 is a top plan view of yet another embodiment of a new and improved apparatus for conditioning particulate material constructed in accordance with the present invention.
Figure 15:
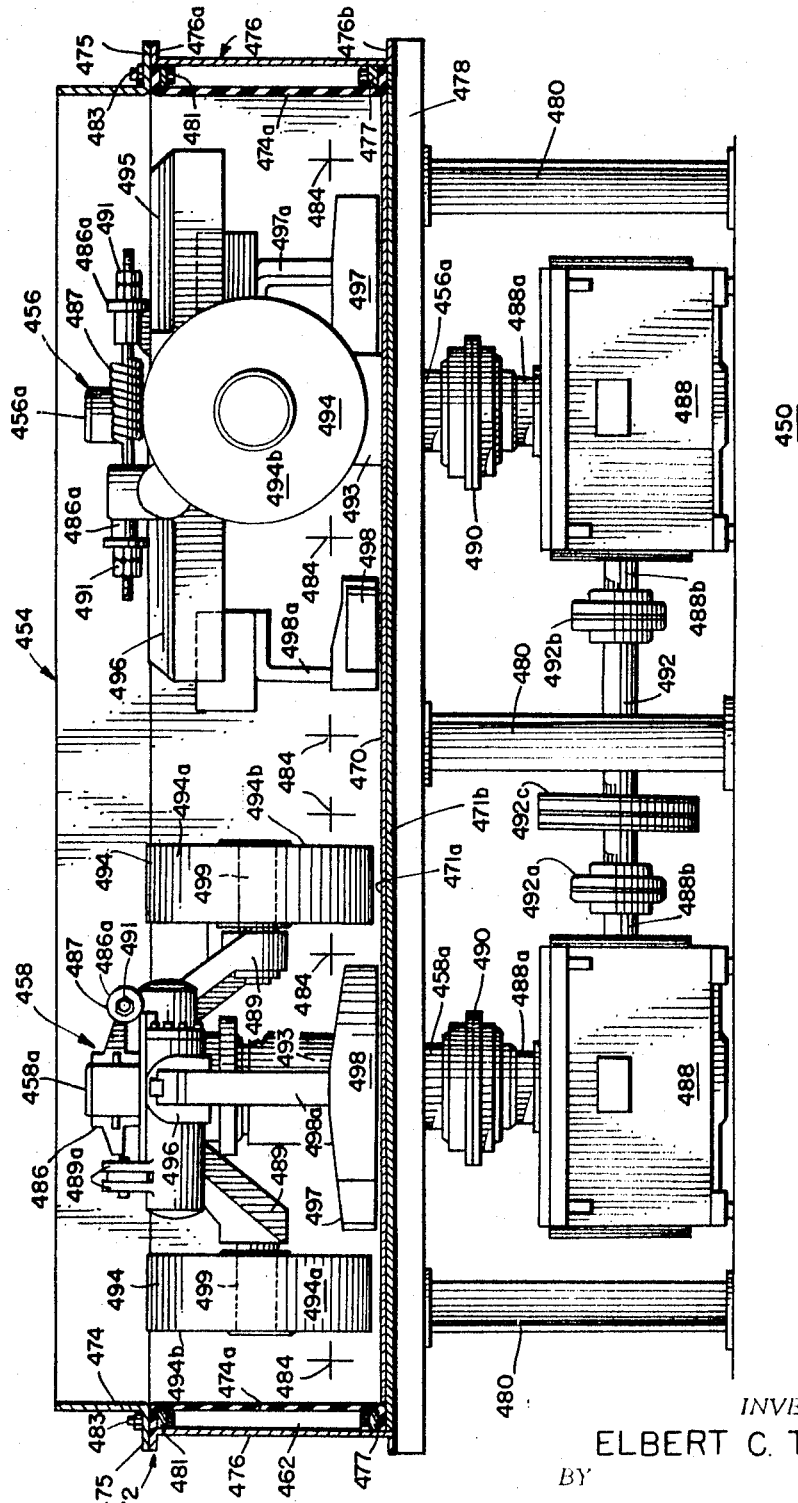
FIG. 15 is a cross-sectional view of the apparatus of FIG. 14 taken substantially along line 15—15 thereof.

In FIGS. 14 and 15 there is illustrated another embodiment of a new and improved apparatus constructed in accordance with the present invention and referred to generally by the reference numeral 450. The mixer 450 is similar in many respects to the mixers 50 and 350 previously described herein employing some features of both, and includes a large rectangular mixing chamber 454 having a pair of spaced apart mixing head assemblies 456 and 458 mounted for rotation therein. The mixing chamber 454 is similar in construction to the chamber 354 previously described in detail except that it is rectangular in plan configuration rather than square in order to accommodate both of the mixing head assemblies 456 and 458 mounted therein. Material is introduced into the mixing chamber in the right-hand end (FIGS. 14 and 15) and is pulverized and mixed by the mixing head 456 as it moves toward the opposite end of the chamber for similar conditioning by the mixing head 458 before discharge through an opening 470a in the mixing chamber floor or bottom wall 470. The mixing chamber side wall structure 472 includes a rigid upper peripheral section 474 and a lower peripheral flexible wall section 474a, and the rigid upper section includes an outwardly extending peripheral flange 475 which is supported on the upper flange 476a of a rectangular outer peripheral jacket 476 having a lower flange 476b resting on the bed structure 478 of the mixer. The flexible inner wall sections 474a and the outer jacket 476 form the inner and outer walls, respectively, of a plenum chamber 462 extending around the perimeter of the mixing chamber. Air is supplied to the plenum chamber 462 for heating or cooling and aerating the material in the mixing chamber and is introduced into the material through a plurality of openings formed by intersecting slits or cuts 484 provided at spaced-apart locations around the flexible sidewall section 474a. The heating or cooling air from the plenum chamber 462 flows through the slits or openings 484 in a plurality of high velocity streams from around the periphery of the chamber directly into the material being mixed and pulverized by the mixing heads 456 and 458.

The mulling head assemblies 456 and 458 may be identical to the mixing heads 256 and 356 previously described, and each includes a pair of large, heavy mulling wheels 494 and an inner and outer plow member 497 and 498, respectively, for grinding, pulverizing and mixing the material. The head assemblies are spaced apart in the mixing chamber so that the plows and wheels thereof do not interfere with one another as they rotate around their respective drive axles 456a and 458a. The spacing between the axles 456a and 458a may be such that the plows of one head assembly traverse a common area with those of the other head assembly intermediate the two. It has been found, however, that because of the rebounding or live action of the flexible wall sections 474a in returning the material toward the central portion of the chamber that the spacing between the axles 456a and 458a can be increased so that the travel paths of the plows from the separate head assemblies no longer overlap a common area. As an example, when the inner plow 497 and mulling wheels 494 of the head assembly 456 force the material outwardly toward one of the longitudinal sidewalls of the mixing chamber, the material rebounds off the wall and is directed toward the other mixing head 458 in a manner somewhat similar to that of a billiard ball striking a cushion on a pool table and rebounding at an angle. Because the mixing head assemblies are preferably rotated in opposite directions as indicated by the arrows in FIG. 14, there is a continuous transfer of material back and forth between the head assemblies as they rotate because of the flexible or live wall action of the wall section 474a.

The resilient flexible wall section 474a around the perimeter of the mixing chamber is continually being deflected outwardly and rebounding inwardly as the mixing heads rotate, producing a live wall action for better mixing and preventing the buildup or collection of material in the corners. The flexible walls permit the rectangular plan configuration of the chamber, thus making construction simpler because no pinched-in midsection between the mixing heads is required. Moreover, even though the corner angles are square because of the planar sidewall construction of the chamber, the material does not tend to collect in the corners because of the flexible walls.

Figure 16:
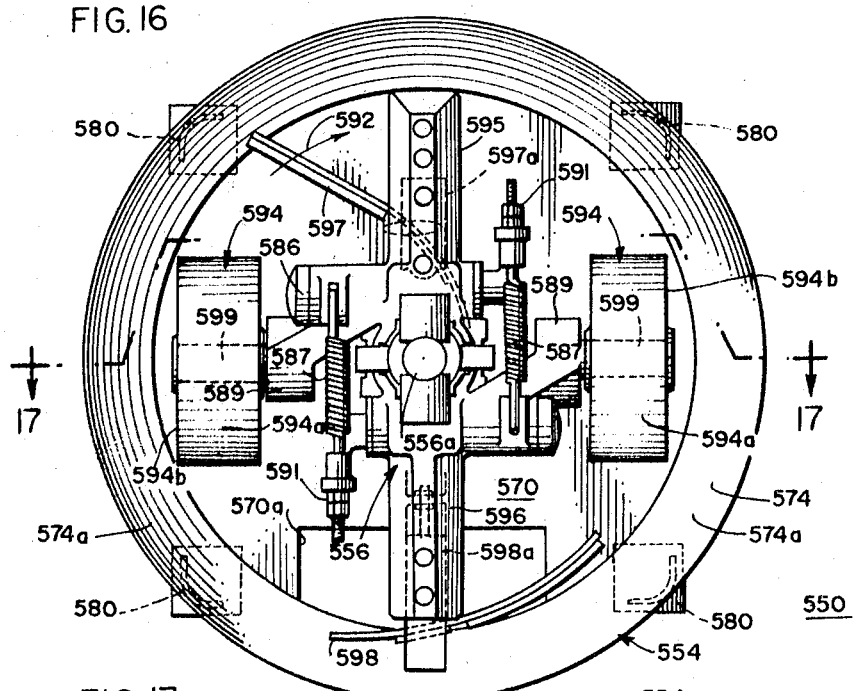
FIG. 16 is a top plan view of still another embodiment of a new and improved apparatus for conditioning particulate material constructed in accordance with the present invention.
Figure 17:
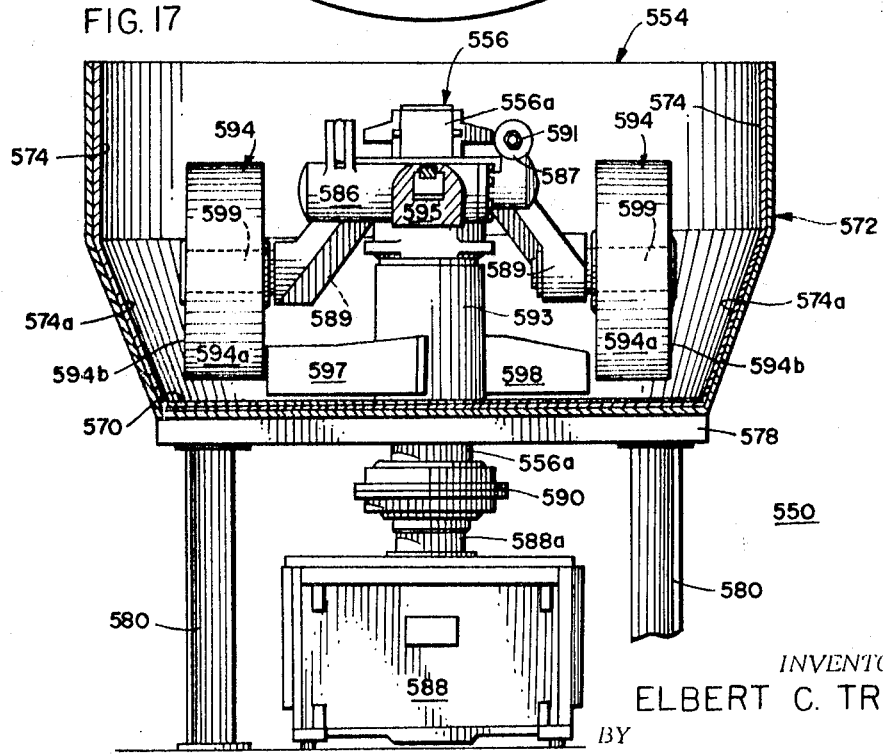
FIG. 17 is a cross-sectional view of the apparatus of FIG. 16 taken substantially along line 17—17 thereof.

Referring now to FIGS. 16 and 17, therein is illustrated another embodiment of a new and improved apparatus for conditioning particulate material constructed in accordance with the present invention and referred to generally by the reference numeral 550. The mixer 550 employs a mixing chamber 554 having a sidewall structure 572 comprising an upper cylindrical section 574 and a lower frustoconical section 574a. The mixing chamber 554 includes a circular floor or bottom wall 570 having a discharge opening 570a therein, and the bottom wall is supported on a bed structure 578 which, in turn, is supported by a plurality of legs 580 from the floor or other supporting surface. Within the mixing chamber 554 is mounted a mixing head assembly 556 of a type similar to the assemblies 256, 356, and 456 previously described. The mixing head assembly 556 is mounted on an upstanding drive axle 556a which is driven by a gear reducer 588 and prime mover (not shown) to rotate the head assembly about the central axis of the mixing chamber, as indicated by the rotational arrow 592 in FIG. 16.

The mixing head assembly 556 includes a pair of large heavy mulling wheels 594 journaled for free rotation on axles 599 extending outwardly from opposite sides of the center axis of the mixing chamber. The mixing head also includes an inner plow 597 and an outer plow 598 positioned with their lower edges adapted to move in close proximity to the floor 570 of the mixing chamber. As the mixing head assembly rotates, the peripheral mulling surfaces 594a of the mulling wheels move the material against the mixer floor of bottom wall 570 and break up any lumps or agglomerates in the material with an intense grinding or pulverizing action. The outer plow 598 moves material adjacent the outer perimeter of the bottom wall 570 inwardly toward the central portion of the chamber into the path of the traveling mulling wheels. The inner plow 597 moves material adjacent the central portion of the mixing chamber outwardly into the path traveled by the mulling wheels.

In accordance with the present invention, the lower sidewall section of the mixing chamber sidewall is constructed to be frustoconical rather than cylindrical and to slope outwardly and upwardly away from the generally vertically extending side faces 594b of the mulling wheels. It has been found that by sloping the chamber sidewall outwardly away from the outer side faces of the traveling mulling wheels, improved mulling action is obtained with less power being expended to drive the mixing head assembly 556. As the mixing head assembly is rotated, each mulling wheel 594 plows a circular path through the bed of material in the mixing chamber, and in doing so causes some of the material to be extruded outwardly toward the sidewall of the chamber as the wheel passes by. This, in effect, increases the thickness of the bed of material adjacent the periphery of the mixing chamber and the outer side faces 594b of the mulling wheels thus have a greater depth of material to shear through as they travel around the chamber. By sloping the sidewall outwardly, the thickness of the material adjacent the periphery of the chamber is effectively reduced so that the side faces 594b of the mulling wheels have a thinner section or thickness of material to shear and plow through and, consequently, less power is required than in mixers of similar capacity employing vertical sidewalls. In addition, the sloping lower sidewall section 574a aids in the mixing action as its slope directs material back toward the central portion of the mixing chamber after the mulling wheels 594 pass by. The sloping section 574a can be constructed of rolled steel plate or, as will be described hereinafter, can be constructed of resilient flexible material somewhat similar to the construction of previously described embodiments.

Figure 18:
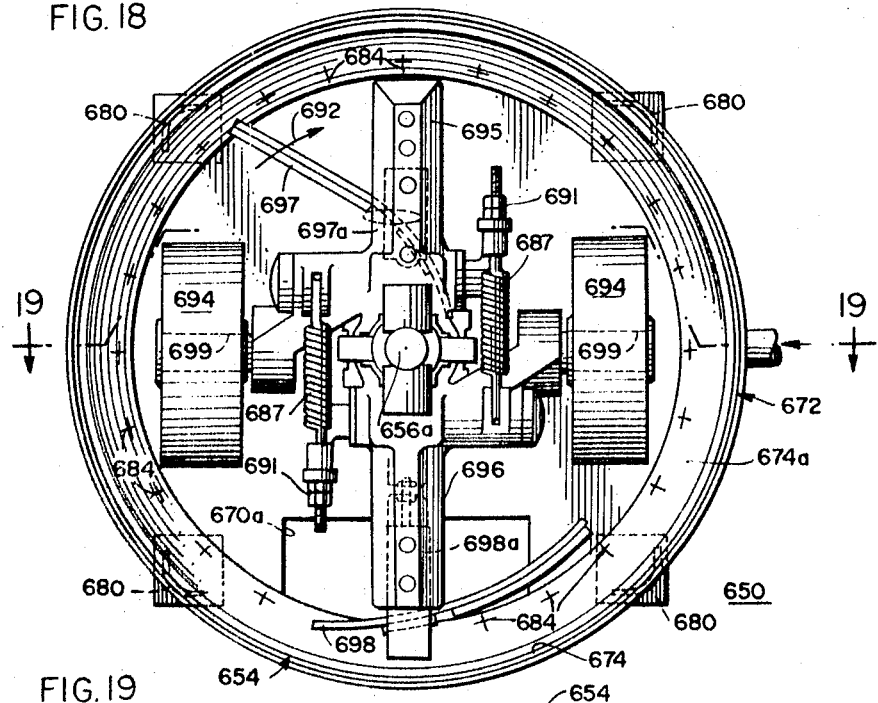
FIG. 18 is a top plan view of still another embodiment of a new and improved apparatus for conditioning particulate material constructed in accordance with the present invention.
Figure 19:
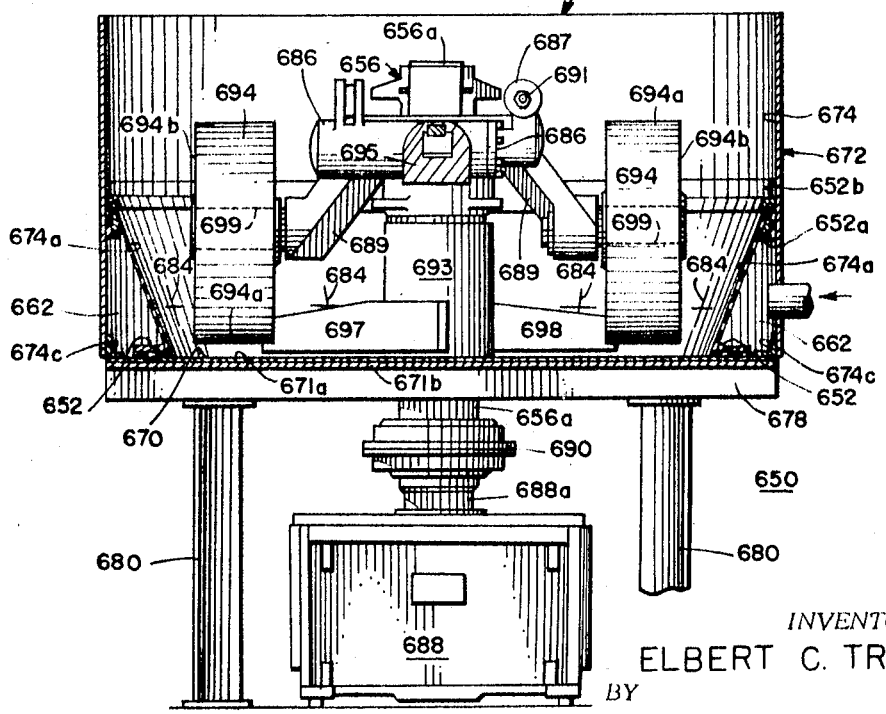
FIG. 19 is a cross-sectional view of the apparatus of FIG. 18 taken substantially along line 19—19 thereof.

In FIGS. 18 and 19 is illustrated another embodiment of a new and improved apparatus for conditioning particulate material constructed in accordance with the present invention and referred to generally by the reference numeral 650. The mixer 650 is very similar to the mixer 550 previously described, but employs a lower frustoconical sidewall section 674a constructed of resilient flexible sheet material, such as synthetic or natural rubber. The sidewall structure 672 of the mixing chamber 654 comprises an upright cylindrical wall section 674 which is joined to the circular mixing chamber floor or bottom wall 670 by a rolled angle 674c. The flexible sloping wall section 674a is stretched under tension between an elevation midway up on the cylindrical wall section 674 and a circular path on the bottom wall 670 inwardly of the outer edge thereof. The lower edge portion of the flexible wall section 674a is turned under and outwardly and is clamped against the floor 670 by a circular clamping ring 652 which comprises an annular ring of flat plate or sheet material with a round rod welded along the inner diameter thereof. The upper edge portion of the flexible wall section 674a is held against the inside surface of the cylindrical sidewall 674 by a cylindrical clamping ring 652a having a round rod welded along the upper edge theerof and the flexible wall material is stretched over the rod and downwardly against the wall. A protective band 652b is provided to protect the upper edge portion of the flexible wall section 674a, and the band is of a somewhat Z-shaped cross section like that shown in FIG. 21. In addition to the advantageous relation between the sloping wall section 674a and the side faces 694b of the mulling wheels, as described previously in connection with the mixer 550, the wall section 674a, being of flexible resilient material, offers additional advantages in that the wall section becomes a live action wall and defines a triangular cross-sectioned annular plenum chamber 662 around the mixing chamber for introducing a flow of air into the material for heating or cooling and aeration through a plurality of crosslike openings 684 cut into the material of the flexible wall section 674a. The mixer 650 thus employs both the sloping wall features and the flexible wall features of the present invention, and provides for the rapid, efficient and thorough mixing, pulverization and heating or cooling aeration of the particulate material in the mixing chamber.

Figure 20:
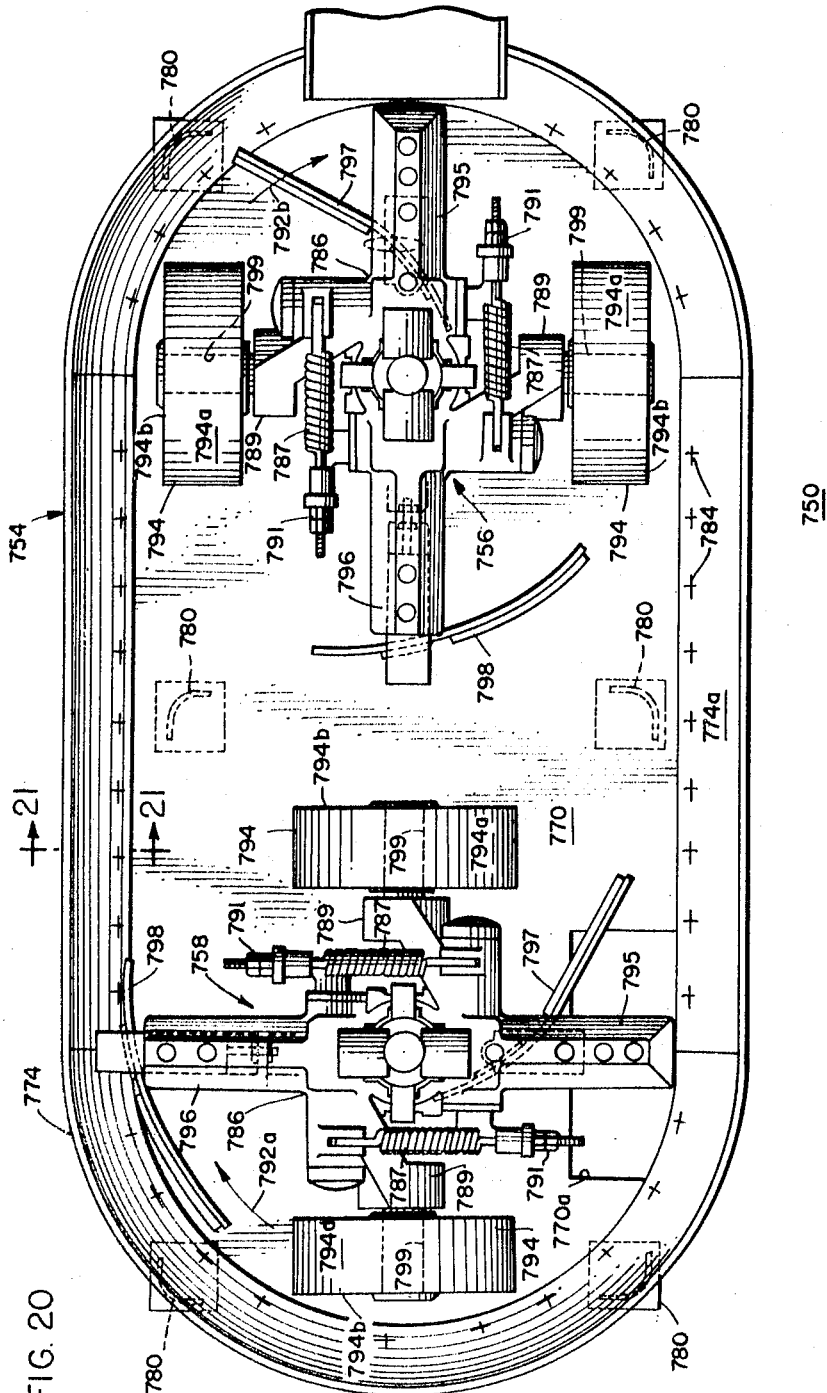
FIG. 20 is a top plan view of yet another embodiment of a new and improved apparatus for conditioning particulate material constructed in accordance with the present-invention.
Figure 21:
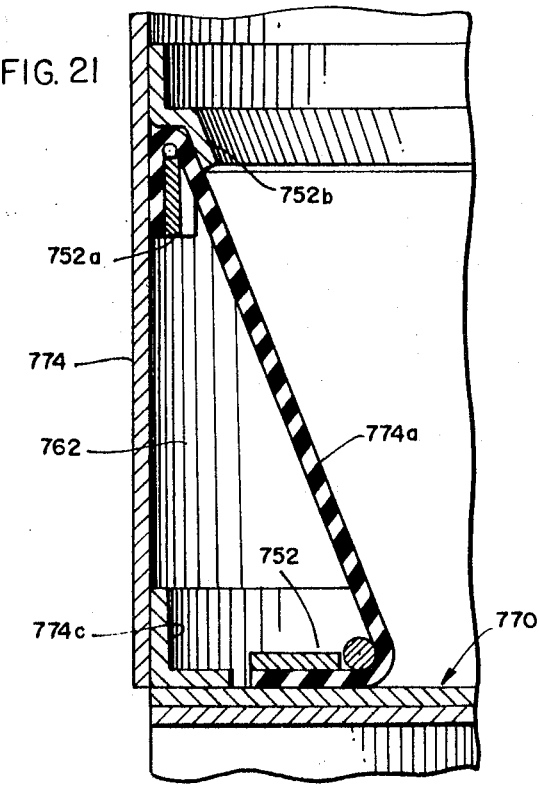
FIG. 21 is a fragmentary cross-sectional view of the apparatus of FIG. 20 taken substantially along line 21—21 thereof.
Figure 22:
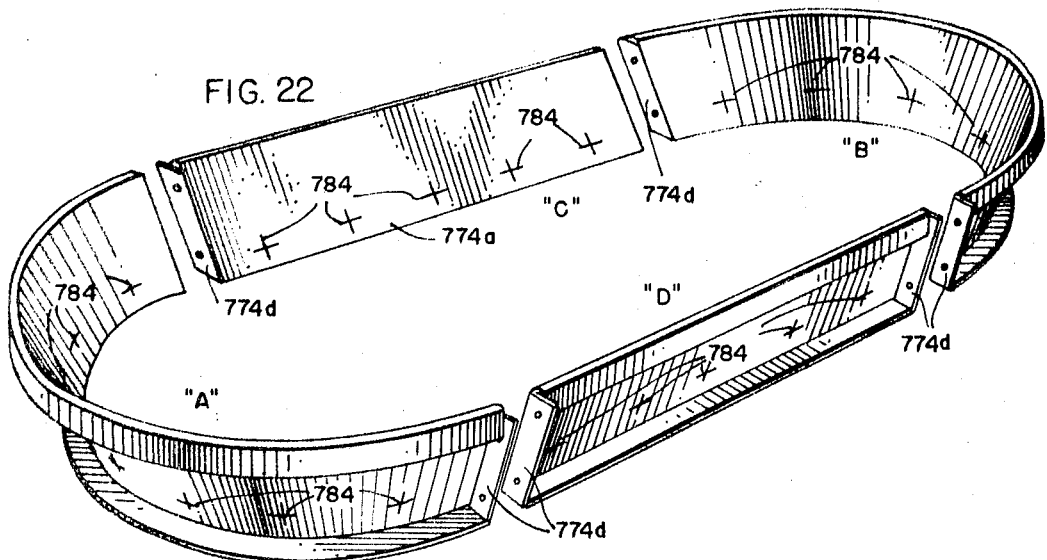
FIG. 22 is an exploded, perspective view of the flexible inner wall means of the apparatus of FIG. 20.

FIGS. 20, 21 and 22 illustrate yet another embodiment of a new and improved apparatus for conditioning particulate material constructed in accordance with the present invention and indicated generally by the reference number 750. The mixer 750 is similar to the mixer 650 previously described, but employs a pair of mixing head assemblies 756 and 758 in a single somewhat elongated mixing chamber 754. The mixing heads are driven to rotate in opposite directions, as indicated by the rotational arrows 792a and 792b (FIG. 20) and may be spaced apart so that travel paths of the plows thereof traverse a common area intermediate the heads, as previously described in connection with the mixer 50. The head assemblies 756 and 758 are similar or identical to those previously described and include large, heavy mulling wheels 794 and inner and outer plows 797 and 798, respectively, for mixing, grinding and pulverizing the material as the heads are rotated.

The mixing chamber 754 includes an upstanding sidewall 774 that is joined to a bottom wall 770 around its perimeter by means of an angle 774c (FIG. 21). A resilient, flexible outwardly sloping lower sidewall section 774a is provided to give the mixing chamber a live action sloping sidewall, and this flexible sidewall section is secured to the bottom wall 770 by a clamping bar and rod 752 and is secured to the inside surface of the upstanding wall 774 by a clamping bar and rod 752a. The upper folded-over edge of the flexible sidewall section 774a is protected by a somewhat Z-shaped structure 752b secured to the inside surface of the wall 774. The resilient flexible wall section 774a forms the inside wall surface of a plenum chamber 762 for supplying air to the material in the chamber through a plurality of crosslike openings 784 cut in the flexible sidewall section. FIG. 22 illustrates a typical construction of the inner flexible sidewall section 774a in four different pieces, including side sections C and D. All of the sections are joined together at their ends with appropriate flanged portions 774d, which are clamped together with suitable stiffeners and bolts (not shown). It should be noted that because of the flexibility of the wall section 774a, it is possible to make the side sections C and D straight, as shown, without the necessity for a pinched-in middle section intermediate the spaced mixing heads.

It should be noted that the last three embodiments of the invention described herein employ mixing head assemblies of the type having large, heavy mulling wheels, and the sidewalls of the mixing chambers are sloped outwardly away from the side faces of the mulling wheels. This combination produces advantageous results in that less power is required and better mixing and mulling action is achieved therein in mixtures employing mulling wheels with vertical sidewalls. The flexible resilient sidewall construction of the present invention provides many useful advantages in that the live wall action prevents buildup of material on the walls, the mixing chamber can be of sharp cornered, plan configuration without causing dead spaces in the corners, or in multiple head machines the requirement for a pinched-in midsection is eliminated and, further, the introduction of high velocity cooling or heating airflow is made simple by using the flexible wall section as the inside wall of a plenum chamber and cutting the required openings directly in the wall section.

While there have been illustrated and described several embodiments of the present invention, it will be appreciated that numerous changes and modifications will occur to those skilled in the art.

What is claimed as new and desired to be secured by Letters Patent of the United States is:

1. Apparatus for conditioning particulate material comprising a mixing chamber having a bottom wall and an upwardly extending sidewall, a mixing head assembly in said chamber rotatable about an upstanding axis therein and including mixing means outwardly of said axis for moving and mixing said material around said chamber and against said sidewall upon rotation of said head, said sidewall including a wall portion constructed of flexible resilient material deflectable inwardly and outwardly toward said axis in response to the pressure of material moved against said sidewall by rotation of said mixing head, said wall portion sloping upwardly and outwardly away from the axis of rotation of said mixing head and including at least two planar wall sections angularly intersecting one another, forming a corner of said mixing chamber.

2. The apparatus of claim 1 including a second mixing head assembly in said chamber including mixing means outwardly of an upstanding rotation axis thereof spaced from said first mentioned axis to provide a region of overlapping coverage in said chamber traversed by both of said mixing means, said flexible wall portion including a pair of spaced-apart planar wall sections disposed on opposite sides of the said region of overlap and intersecting said bottom wall along parallel lines.

3. The apparatus of claim 1 including a plenum chamber means extending along said flexible wall portion outwardly thereof, said flexible wall portion having passage means defined therein communicating between the interior of said mixing chamber and said plenum chamber for directing a high velocity fluid flow into said chamber, said passage means including openings formed in said flexible wall sections at spaced-apart locations therein.

4. The apparatus as defined in claim 3 wherein each of said openings is formed by a pair of elongated slots angularly intersecting one another intermediate their ends.

5. The apparatus of claim 3 wherein said plenum chamber means includes a lower wall formed by the bottom wall of said mixing chamber and an upstanding peripheral wall extending upwardly therefrom.

6. The apparatus of claim 5 wherein said cable means extends between opposed facing portions of said plenum chamber peripheral wall.

7. The apparatus as defined in claim 1 wherein said sidewall includes rigid supporting means for supporting upper and lower longitudinal edges of said flexible wall portion.

8. The apparatus of claim 7 wherein said flexible wall portion is under tension between said rigidly supported upper and lower longitudinal edges thereof.

9. The apparatus of claim 7 including flexible cable means extending between said rigid supporting means and means connecting said cable means intermediate its length with said flexible wall means exteriorly of said mixing chamber between said rigid support means.

10. The apparatus of claim 9 wherein said lower rigid support means includes said bottom wall of said mixing chamber and said cable means extends parallel thereto.

11. The apparatus of claim 1 including discharge door means formed by an integral portion of said flexible wall means, said door means including a movable lower edge adapted to open away from an adjacent edge portion of said mixing chamber bottom wall, and operator means connected to said door means adjacent said lower edge for opening and closing said door means.

12. The apparatus of claim 11 wherein said operator means includes fluid cylinder means having a fixed end supported from said mixing chamber and a movable end secured to an outside surface of said door means.

13. Apparatus for conditioning particulate material comprising a mixing chamber having a bottom wall and a peripheral sidewall extending upwardly therefrom, a mixing head assembly in said chamber rotatable about an upstanding axis therein and including mixing means outwardly of said axis movable around said chamber on rotation of said head for mixing said material, said sidewall including at least a portion thereof formed of resilient flexible material and movable toward and away from said mixing head in response to the pressure of material there again, and a plenum chamber around said flexible portion of said sidewall, and opening defining means formed in said flexible sidewall portion to direct fluid from said plenum chamber directly into the material in said mixing chamber.

14. The apparatus of claim 13 wherein said opening defining means includes a plurality of spaced-apart openings, each formed by a pair of intersecting slits in said flexible material.

15. The apparatus of claim 13 including a second mixing head assembly spaced from said first mentioned mixing head assembly to rotate about a second upstanding axis in said chamber, said second mixing head assembly including mixing means outwardly of said second axis movable around said chamber in selected synchronous rotation with said first mentioned mixing head, said resilient flexible sidewall portion including a pair of spaced-apart planar sections on opposite sides of said spaced mixing head assemblies and intersecting said bottom wall along parallel lines.

16. The apparatus of claim 13 wherein said flexible wall portion includes at least two planar wall sections angularly intersecting one another, forming a corner of said mixing chamber.

17. The apparatus of claim 13 wherein said sidewall includes means for rigidly supporting said flexible sidewall portion along upper and lower spaced-apart edges.

18. The apparatus of claim 17 wherein said lower edge of said flexible sidewall portion is secured against said bottom wall and said flexible sidewall portion extends upwardly and outwardly therefrom with an upper edge secured to an upstanding rigid portion of said sidewall.

19. The apparatus of claim 18 including a plenum chamber around said mixing chamber having an inner wall formed by said flexible sidewall portion, an outer wall formed by said upstanding rigid side wall portion, and a bottom wall formed by the bottom wall of said mixing chamber.

20. Apparatus for conditioning particulate material comprising a mixing chamber having a bottom wall and a peripheral sidewall extending upwardly therefrom, a mixing head assembly in said chamber rotatable about an upstanding axis and including a mixing member spaced outwardly of said axis movable around said chamber on rotation of said head, said sidewall including a lower portion sloping upwardly from said bottom wall and outwardly of said mixing head axis, a plenum chamber outwardly adjacent said sloping portion of said sidewall having an inner wall defined thereby, and opening defining means in said sloping portion for directing gaseous fluid from said plenum chamber directly into the material in said mixing chamber for cooling said material.

21. The apparatsu of claim 20 wherein said lower sloping portion is formed of resilient flexible material.

22. The apparatus of claim 21 wherein said peripheral sidewall includes an upstanding outer structure joined along its lower edge to the periphery of said bottom wall forming an outer wall of said plenum chamber formed around said mixing chamber between said outer structure and said lower sloping portion of said sidewall.

23. The apparatus of claim 20 including a second mixing head assembly similar to said first mentioned head assembly and mounted for rotation in said mixing chamber about a second spaced-apart upstanding axis, said lower sloping portion of said sidewall including a pair of planar sections extending between and on opposite sides of planar sections extending between and on opposite sides of said head assemblies and intersecting said bottom wall along parallel lines.

24. The apparatus of claim 23 wherein said lower sloping portion of said sidewall includes a pair of end sections joining adjacent ends of said planar sections.

References Cited

UNITED STATES PATENTS

| | | | |
|---|---|---|---|
| 2,978,147 | 4/1961 | McIlvaine | 222—185 |
| 3,256,573 | 6/1966 | Hunter | 241—110 X |

FOREIGN PATENTS

| | | |
|---|---|---|
| 339,528 | 12/1930 | Great Britain. |
| 497,479 | 9/1954 | Italy. |
| 1,016,412 | 9/1957 | Germany. |

FRANK T. YOST, Primary Examiner.